(No Model.)
G. M. RICHMOND.
Feather-Duster.
No. 227,837.                   Patented May 18, 1880.
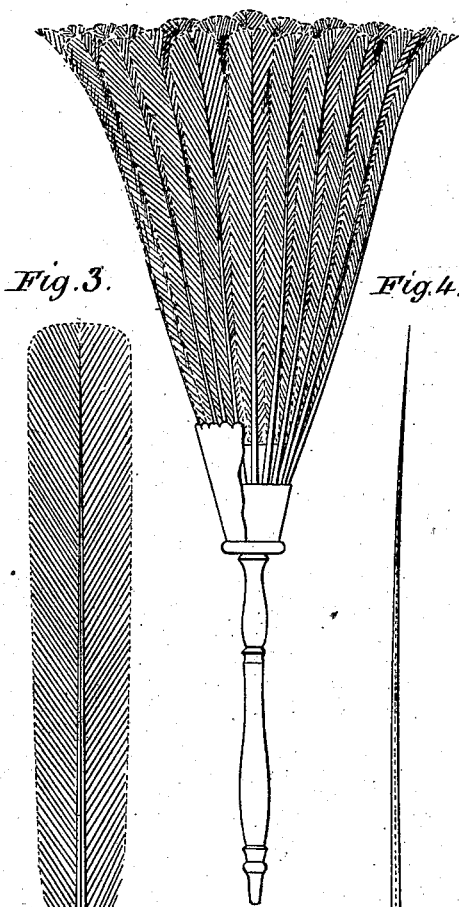
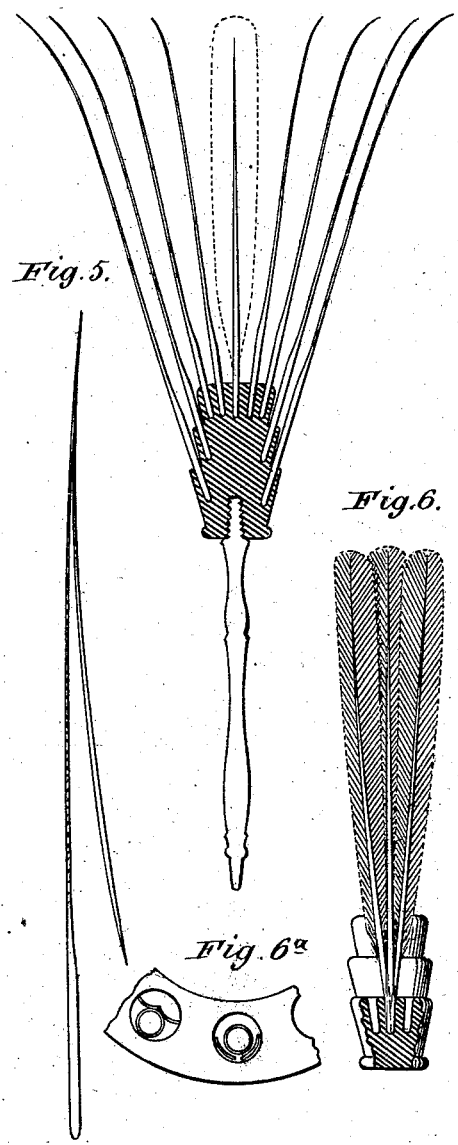
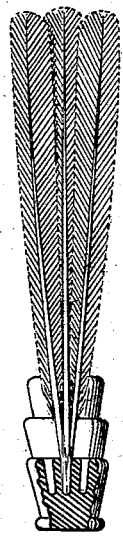
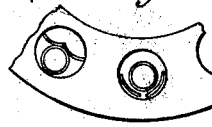
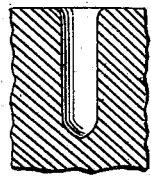
Witnesses:
W. B. Masson
W. E. Bowen
Inventor
Gilbert M. Richmond
by E. E. Masson
atty.
N. PETERS, PHOTO-LITHOGRAPHER, WASHINGTON, D. C.

United States Patent Office.

GILBERT M. RICHMOND, OF CHICAGO, ILLINOIS, ASSIGNOR TO LEONARD A. WATSON, OF ASHTABULA, OHIO.

FEATHER DUSTER.

SPECIFICATION forming part of Letters Patent No. 227,837, dated May 18, 1880.

Application filed March 12, 1880. (No model.)

*To all whom it may concern:*

Be it known that I, GILBERT M. RICHMOND, of Chicago, in the county of Cook and State of Illinois, have invented a new and useful Improvement in Feather Dusters, of which the following is a specification, wherein reference is made to the annexed drawings, in which—

Figure 1 represents a view, in elevation, of my improved duster. Fig. 2 represents a longitudinal section through the same. Fig. 3 represents, in front view, the under side of a tail-feather of the turkey. Fig. 4 represents a side elevation of the same. Fig. 5 represents the same view of the feather shown in Fig. 4, but with a portion of the rib or under side of the shaft of the feather split nearly off. Fig. 6 represents a modified arrangement of a brush embodying, in part and less perfectly, the improvement I have hereinafter described, Fig. 6ª being a top view, on an enlarged scale, of a portion of the same, the top of the feathers being removed to show the arrangement of the stems in two of the holes. Fig. 7 represents, in section, a portion of the brush-head with one of the holes for the reception of the feather, on an enlarged scale.

In the manufacture of feather dusters large stiff tail and wing feathers of the turkey and other birds have heretofore been split or shaved, and also withed, to give them lightness and pliability and render dusters or dusting-brushes made of them soft and flexible. Feathers thus prepared have been bound with wire or otherwise to a head at the outer extremity of the handle of the implement; and to prevent the duster from being of too large diameter at the place of binding, and so giving the brush too much spread, rendering it too bulky, and requiring too many feathers to fill it, it has been the practice, when removing the rib of the feather, to extend the split through to the end of the quill, and thus remove the entire under side of the shaft, or else, when the shaft was not split clear down to the end of the quill, it was bound to the head just above the quill, and the unsplit projecting ends of the quills, after binding, were cut off. If the quills were not thus split, they would not only increase the bulk around the head of the brush much more than split quills, but they would require much thicker and stronger binding-wire to compress them tightly enough around the head to hold them securely in place.

To remedy these and other defects, and at the same time utilize to the utmost the full length of the feather, I remove the rib from only that portion of the shaft which is above the quill, so that I may have a large surface and the arched or tubular form of the feather at its lower end to connect it with and hold it out firmly from the head, while the upper or tip end of the feather is rendered as pliable as possible. In this way the great natural strength of the quill of the feather is made available to plant it firmly in the head, and from its upper portion, where weight and stiffness are objectionable, all redundant material is removed.

To render the upper portion of the feathers still more pliant and the brush softer, I prefer to withe that portion of the back of the shaft from which the rib is stripped, and likewise to rasp the pith from the under side of the back. The feathers thus prepared I plant in concentric series of holes made in the head, as shown in the drawings, the inner or central holes being parallel with the axis of the head, and those which are outside of the center diverging from the axis at a suitable inclination to give the required spread and density of feathers at the outer extremity of the brush. The holes, at the time of planting the feathers in them, are charged with a resin or asphaltum cement, such as hair-brush makers use for securing the bunches of hair in their holes in the back of the brush; but any other suitable cement may be used.

The modification shown in Figs. 6 and 6ª represents a duster in which each feather is not planted in a separate hole, but the holes are made larger, and in each of them a bunch of two or three feathers is inserted. One of the feathers may be prepared with its quill of full size and the rib split off its outer end only, and the companion feather or feathers, as the case may be, in the bunch may have their shafts split clear to the end of the quill, the single unsplit quill being relied upon mainly to support the bunch.

The holes in the head for holding the feathers I prefer to make with beveled or rounded mouths, as seen in Fig. 7, to avoid presenting a sharp corner for the side of the quill to bear against, as such a rest increases its liability to kink or break down.

Of course, the common stiff feather duster would be improved if my invention were only partially availed of by detaching the rib partially or imperfectly from the outer portion of the back of the shaft and withing the outer portion of the shaft less completely, and I have made such imperfect dusters, but with no advantage sufficient to countervail their inferiority.

I have not deemed it necessary herein to describe more particularly the manner of preparing the feathers by splitting, shaving, withing, or rasping their shafts, as these processes are all fully described in patents heretofore granted to me. Nor have I deemed it necessary to describe how the head of the duster may be fabricated of wood or other suitable material by turning, boring, polishing, painting, varnishing, or otherwise; nor how the feathers are inserted and cemented in the holes with the planes of their vanes as nearly as may be in the tangents of the circles in which they are respectively arranged around the axis of the duster, as shown in the drawings; nor how the leather band which covers the junction of the outer circle of feathers with the head and the adjacent portions of the head and feathers is constructed and applied, as these things are well known to brush and duster makers.

I claim—

As a new article of manufacture, a feather duster made, substantially as herein described, of feathers with the outer portions of their shafts split, or split and withed, or split, withed, and rasped, to make them soft and pliable, and the inner or quill portions of their shafts left tubular, that they may stand firmly in the head to hold their plumes outspread, thus combining the firmness of the unsplit-feather duster with the pliability of the split-feather duster, substantially as described.

GILBERT M. RICHMOND.

Witnesses:
E. E. MASSON,
W. B. MASSON.